June 23, 1953

C. HERZOG 2,642,978

ARTICLE FEEDING APPARATUS

Filed Sept. 21, 1950

INVENTOR
C. HERZOG
BY
W.C. Parnell
ATTORNEY

June 23, 1953

C. HERZOG 2,642,978

ARTICLE FEEDING APPARATUS

Filed Sept. 21, 1950

INVENTOR
C. HERZOG

BY
*W.C.Parnell*
ATTORNEY

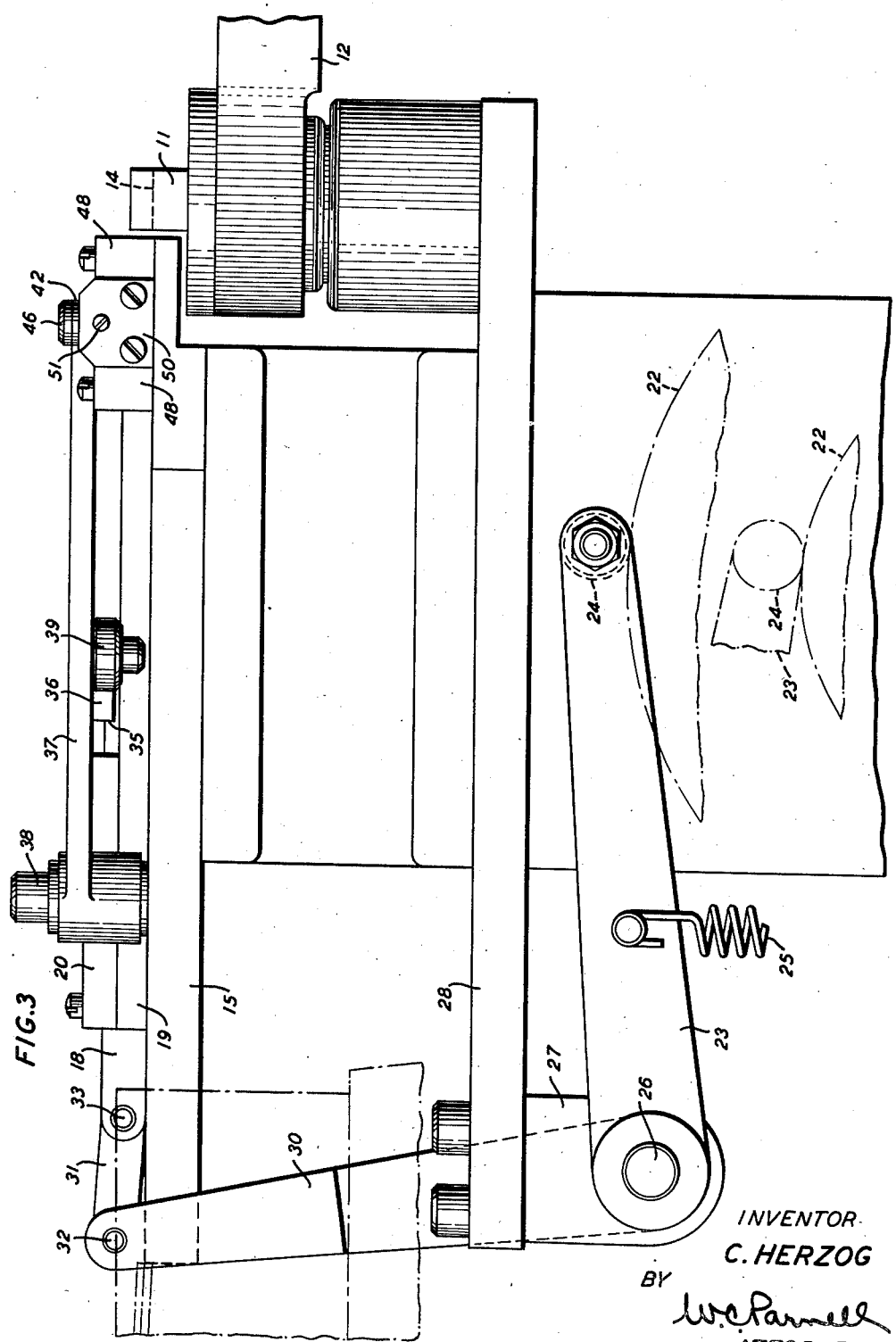

June 23, 1953  C. HERZOG  2,642,978
ARTICLE FEEDING APPARATUS
Filed Sept. 21, 1950  5 Sheets-Sheet 4
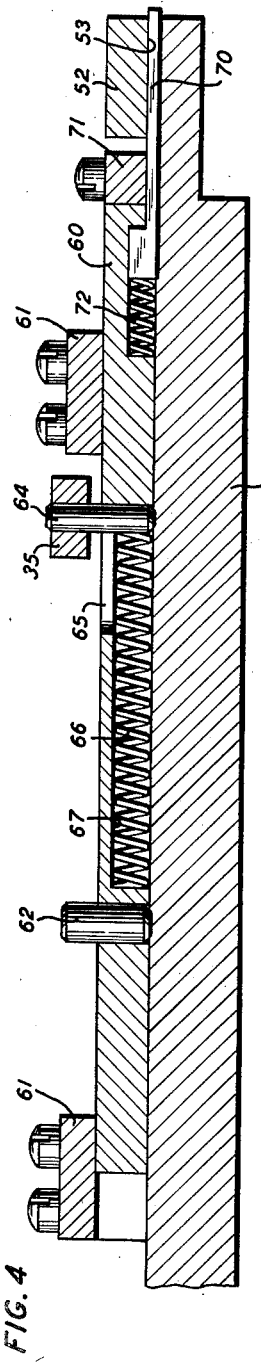
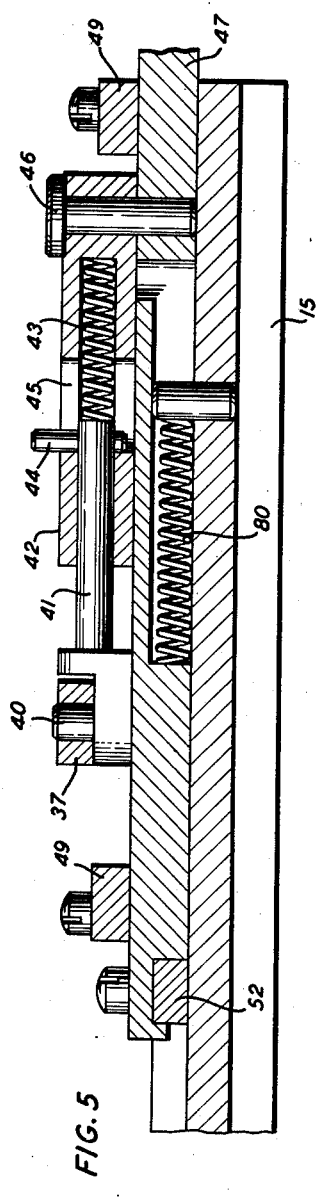
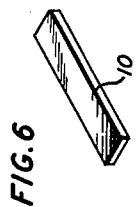
INVENTOR
C. HERZOG
BY
W.C.Parnell
ATTORNEY June 23, 1953  C. HERZOG  2,642,978
ARTICLE FEEDING APPARATUS
Filed Sept. 21, 1950  5 Sheets-Sheet 5

INVENTOR
C. HERZOG
BY
W.C. Parnell
ATTORNEY

Patented June 23, 1953

2,642,978

UNITED STATES PATENT OFFICE 2,642,978

ARTICLE FEEDING APPARATUS

Carl Herzog, Belleville, N. J., assignor to Western Electric Company, Incorporated, New York, N. Y., a corporation of New York Application September 21, 1950, Serial No. 186,002

4 Claims. (Cl. 198—24)

This invention relates to article feeding apparatus and more particularly to apparatus for intermittently feeding articles to receiving units.

In the manufacture of mercury switches, several parts are utilized in the formation of the armature of the switch, these parts being automatically assembled or positioned with respect to each other and welded together. In the present embodiment of the invention, receiving units are successively moved into the receiving position, these units, for example, being mounted on a circular table moved intermittently so that an empty unit is in position when the article is to be fed thereto. The articles are rectangular strips of metal initially placed in a hopper of a commercially known type which moves the articles in a given path end to end where they are received by the apparatus which constitutes the present invention.

The object of the present invention is to provide an article feeding apparatus which is simple in structure yet efficient and completely automatic in operation to successively feed articles to receiving units.

With this and other objects in view, the invention comprises an article feeding apparatus designed for use in combination with an intermittently movable table having article receiving units successively moved into a receiving position. The apparatus includes means for advancing the articles in a given path out of alignment with the receiving position and mechanisms operable in given timed relation with respect to each other to singly move the articles from the path into alignment with the receiving position and subsequently feeding the articles to the receiving units.

In the present embodiment of the invention a table supports the articles as they are moved between guides in their given path, the table also supporting a carriage reciprocated between given limits through the operation of a cam and cam lever. The carriage supports an element having one portion in the form of a cam to control the operation of a feeding unit which functions to remove the articles singly from the path, move them into the receiving position and guide the articles as they are ejected from the apparatus and fed to the receiving units. The element on the carriage also controls a slide supporting the ejecting member which feeds the aligned article onto the receiving unit.

Other objects and advantages will be apparent from the following detailed description when considered in conjunction with the accompanying drawings wherein:

Fig. 3 is a side elevational view of the apparatus as shown in Fig. 1;

Fig. 4 is a longitudinal sectional view taken along the line 4—4 of Fig. 2;

Fig. 5 is a longitudinal sectional view taken along the line 5—5 of Fig. 1;

Fig. 6 is an enlarged isometric view of one of the articles; and

Figure 1:
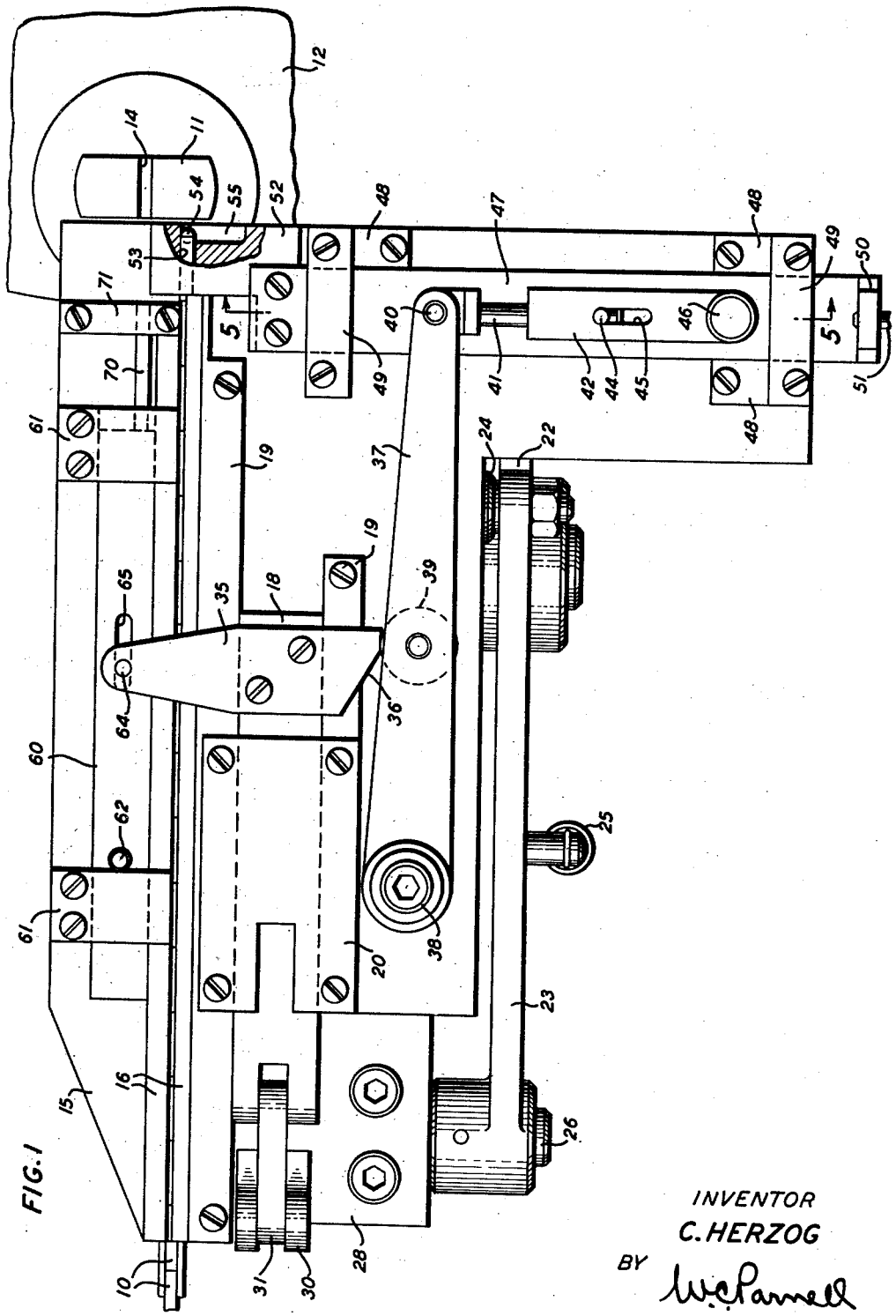
Fig. 1 is a top plan view of the apparatus shown in its starting position.
Figure 2:
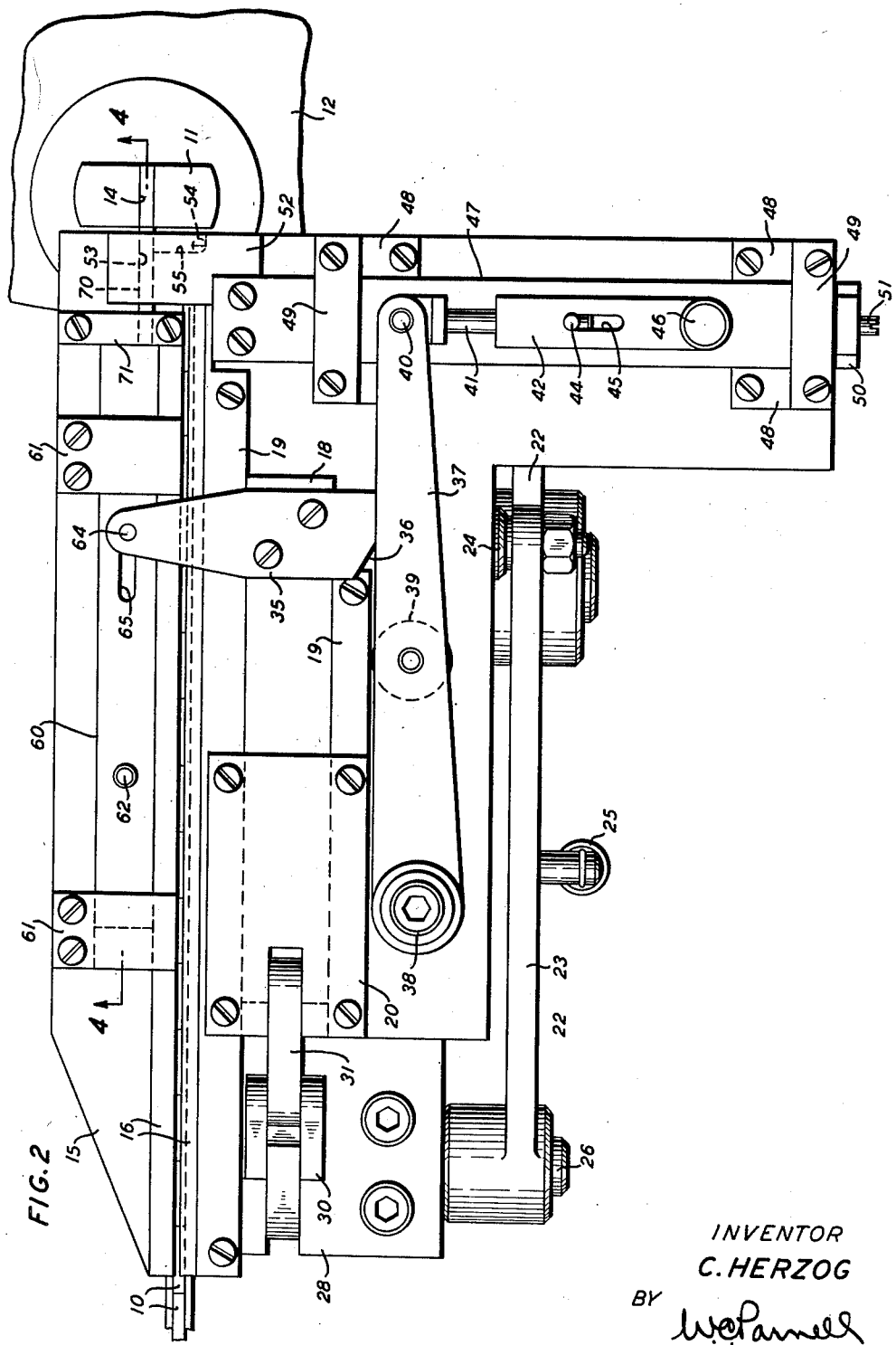
Fig. 2 is a top plan view of the apparatus at the end of a feeding operation.
Figure 7:
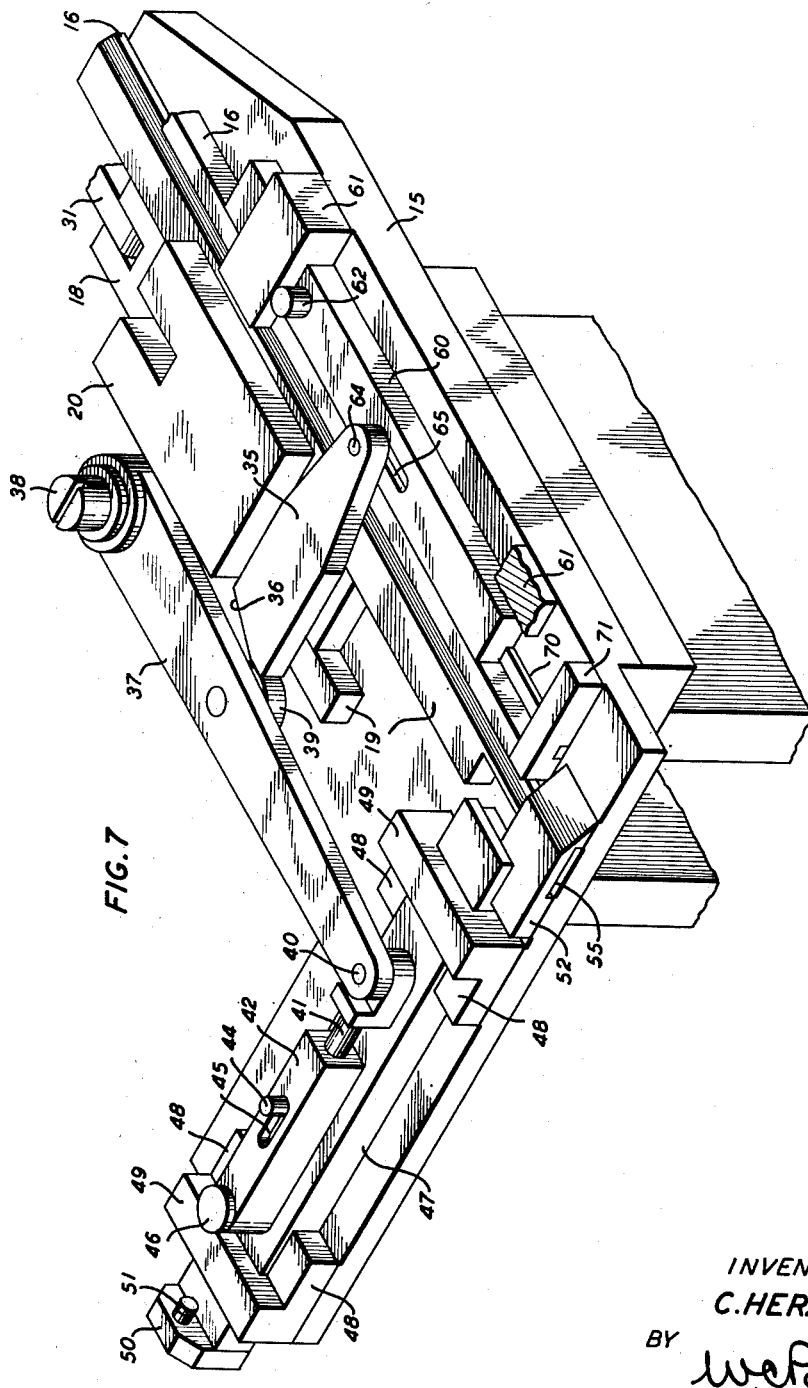
Fig. 7 is an isometric view of the apparatus.

Referring now to the drawings, the apparatus is to intermittently feed rectangular metal articles 10 in a given path toward receiving units 11, only one of which is shown, mounted at spaced positions on a turret 12 operated through certain means (not shown) to successively position the receiving units 11 at the receiving position shown in Figs. 1 and 2. Each receiving unit 11 is recessed at 14 to receive the articles 10 singly and carry them away from the apparatus.

The apparatus includes a table 15 mounted in a horizontal position and provided with parallel guides 16 for the articles 10 as they are advanced toward, but out of alignment with, the receiving position which is determined by the position of the units 11. The table 15 also supports a carriage 18 slidable between guides 19 and beneath a cover plate 20 so that the carriage is moved in a given path through the operation of its actuating mechanism. The actuating mechanism for the carriage includes a cam 22 (Fig. 3) rotated continuously on its shaft (not shown) and provided with the high and low portions illustrated in this figure to cause rocking movement of its lever 23. A cam roller 24 on the outer end of the lever 23 is caused to ride upon the periphery of the cam 22 by a spring 25, the inner end of the lever being fixedly mounted on a shaft 26 which is journalled in a bearing 27 supported by a bracket 28 beneath the table 15. The shaft 26 has a lever 30 fixedly mounted thereon, the upper end 30 of the lever being bifurcated to straddle a link 31 which serves to connect the lever with the slide 18 through the aid of pivots 32 and 33.

An element 35 is mounted on the carriage 18 and movable therewith. One end of the element 35 is provided with a cam surface 36 controlling the operation of a lever 37 which is pivotally mounted at 38 on the table 15. A cam roller 39 supported by the lever 37 is positioned in the path of the cam surface 36 whereby the element 35, when in the starting position shown in Fig. 1, will hold the lever 37 in its farthest clockwise or starting position. The outer end of the lever 37 is connected through a pivot 40 to a rod 41 which extends into a hollow arm 42, as shown in Fig. 5, where it is normally urged in a direction tending to move the lever 37 counterclockwise by a spring 43. A pin 44 carried by the rod 41 and movable in an elongate aperture 45 in the arm 42 limits the outward movement of the rod 41 and maintains connection between the rod and the arm 42. The outer end of the arm 42 is pivotally connected at 46 to a slidable feeding member 47 which is movable between guides 48 and beneath cover strips 49. One end of the member 47 has an angular portion 50 supporting an adjustable stop screw 51 positioned to engage the adjacent cover strip 49 to limit movement of the member 47 in one direction.

A feeding element 52 is mounted on the opposite end of the member 47 and is positioned to slide on the table 15. A recess 53 is formed in the element 52 to singly receive the articles 10, this recess being in alignment with the path of the articles as they are advanced between the guides 16 when the apparatus is in the starting position shown in Fig. 1. A stop 54, in the form of a pin mounted in an aperture of the table 15 and having its upper portion partially cut away to provide a flat surface to be engaged by the leading edge of the first article, is covered by the feeding element 52 but the feeding element is provided with a cutaway portion 55 whereby the element may be moved relative to the stop.

The ejecting mechanism includes a slide 60 shown more in detail in Fig. 4, the slide being mounted for movement on the table 15 in a given path controlled by guides 61. A pin 62 extending upwardly from the slide 60 and positioned to engage the left-hand guide 61 serves to limit the movement of the slide into its starting position shown in Fig. 1. The element 35 extends over the slide 60 and carries a pin 64 which extends downwardly into an elongate opening 65 where it engages the adjacent end of a spring 66. The spring 66 is housed in a cutaway portion 67 of the slide 60 and serves to normally move the slide 60 toward its starting position. An ejecting element 70, movable in a path in alignment with the recess 14 of each receiving unit 11 when in the receiving position under the control of a guide 71 on the table 15, is connected to the forward end of the slide 60 shown in Fig. 4 and is backed up by a spring 72.

Considering now the operation of the apparatus, let it be assumed that the cam 22, which is the controlling element for the operation of the apparatus, is driven in synchronism with the driving means for the turret 12 so that during each feeding operation of the apparatus, a receiving unit 11 of the turret 12 will have been located in the receiving position. Furthermore, the articles 10 are advanced in the path controlled by the guide 16 out of alignment with the feeding or receiving position. When the apparatus is in its starting position (shown in Fig. 1), the recess 53 of the feeding element 52 is in alignment with the path of the articles to receive the leading article and slide it laterally on the table into the receiving position between the ejecting element 70 and the recess 14. This is brought about through rotation of the cam 22 which rocks the levers 23 and 30 to move the carriage 18 to the right from its position shown in Fig. 1. During the first portion of the movement of the carriage, the cam surface 36 of the element 35 rides over the roller 39, allowing a spring 80 in the member 47 (Fig. 5) to move the member together with the feeding element 52 from the starting position, shown in Fig. 1, to the feeding position, shown in Fig. 2. When this takes place the leading article is removed from the path, the element holding the remaining articles from advancement until after the first article has been ejected and moved into the recess 14 of the adjacent unit and the recess 53 again moved into alignment with the remaining articles.

While the leading article is removed from the line of articles and moved into the receiving position, the pin 64 of the element 35 is moving to the right (Fig. 1), but the slide 60 remains unoperated under the control of the spring 66 until the pin reaches the end of the aperture 65, at which time, during the continued movement of the slide 18 with the element 35 to the right (Fig. 1), the ejecting element 70 will engage the article in the feeding position and move it from recess 53 of the feeding element 52 into the recess of the adjacent receiving unit 11. In this manner the article is not only moved out of the line of articles, but is held in the recess 53 of the feeding element which controls its movement by the ejecting element into the receiving unit.

This completes one half the operating cycle. The article has been fed to the receiving unit, but during the next half cycle of the cam 22, the lever 23 moves from its broken line position to its solid line position to return the operated parts from the position shown in Fig. 2 to the position shown in Fig. 1. This is brought about through the movement of the carriage 18 to the left first allowing the spring 66 to move the slide 60 to the left to remove the ejecting element from the recess 53 while the feeding element 52 with its member 47 is held in the operated position through the force of the spring 80. After the ejecting element 70 has been removed from the recess 53 of the feeding element 52, the cam surface 36 will engage the roller 39 of the lever 37 operating the lever into the position shown in Fig. 1, thus returning the member 47 with the feeding element 52 to its starting position. The operation will be repeated successively as the receiving elements or units 11 are moved into the receiving position to first remove the leading article into alignment with the recess 14, guide it while being ejected into the recess 14 of the adjacent unit 11 and returned to the normal position to receive the next article.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An article feeding apparatus in combination with an intermittently movable table having article receiving units successively moved by the table into a receiving position, the apparatus comprising means to advance articles successively in a given path out of alignment with the receiving position, a member having a recess to receive the leading article in a loading position in alignment with the path and movable between the loading position and a feeding position in alignment with the receiving position, means normally urging the member toward the feeding position, a lever operatively connected to the member, an ejector normally positioned out of the path of the member and movable through the recess when actuated to move the article therefrom and onto the unit at the receiving position and an element movable in one direction to free the lever for movement of the member into the feeding position and subsequently actuate the ejector.

2. An article feeding apparatus in combination with an intermittently movable table having article receiving units successively moved by the table into a receiving position, the apparatus comprising means to advance articles successively in a given path out of alignment with the receiving position, a member having a recess to receive the leading article in a loading position in alignment with the path and movable between the loading position and a feeding position in alignment with the receiving position, means normally urging the member toward the feeding position, a lever operatively connected to the member, an ejector normally positioned out of the path of the member and movable through the recess when actuated to move the article therefrom and onto the unit at the receiving position, an element movable in one direction to free the lever for movement of the member into the feeding position and subsequently actuate the ejector and means included in the operative connection of the lever with the member whereby the member may remain against movement toward the loading position during movement of the ejector from the recess and during actuation of the lever.

3. An article feeding apparatus in combination with an intermittently movable table having article receiving units successively moved by the table into a receiving position, the apparatus comprising means to advance articles successively in a given path out of alignment with the receiving position, a member having a recess to receive the leading article in a loading position in alignment with the path and movable between the loading position and a feeding position in alignment with the receiving position, means normally urging the member toward the feeding position, a lever operatively connected to the member, an ejector normally positioned out of the path of the member and movable through the recess when actuated to move the article therefrom and onto the unit at the receiving position and an element movable in one direction to free the lever for movement of the member into the feeding position and subsequently actuate the ejector, and movable in another direction to return the ejector to its normal position and subsequently actuate the lever to return the member to its loading position.

4. An article feeding apparatus in combination with an intermittently movable table having article receiving units successively moved by the table into a receiving position, the apparatus comprising means to advance articles successively in a given path out of alignment with the receiving position, a member having a recess to receive the leading article in a loading position in alignment with the path and movable between the loading position and a feeding position in alignment with the receiving position, means normally urging the member toward the feeding position, a lever operatively connected to the member, an ejector normally positioned out of the path of the member and movable through the recess when actuated to move the article therefrom and onto the unit at the receiving position, an element movable in one direction to free the lever for movement of the member into the feeding position and subsequently actuate the ejector, and movable in another direction to return the ejector to its normal position and subsequently actuate the lever to return the member to its loading position and means included in the operative connection of the lever with the member whereby the member may remain against movement toward the loading position during movement of the ejector from the recess and during actuation of the lever.

CARL HERZOG.

References Cited in the file of this patent
UNITED STATES PATENTS

| Number | Name | Date |
| --- | --- | --- |
| 1,609,802 | Ekstrom | Dec. 7, 1926 |
| 1,781,873 | Hamrol | Nov. 18, 1930 |
| 2,009,751 | Stenman | July 30, 1935 |
| 2,398,293 | Dorothea | Apr. 9, 1946 |
| 2,509,123 | Bailey | May 23, 1950 |
| 2,547,551 | Yost | Apr. 3, 1951 |